United States Patent
Choudhury et al.

(10) Patent No.: US 7,006,441 B1
(45) Date of Patent: Feb. 28, 2006

(54) LINK STATE NETWORK HAVING WEIGHTED CONTROL MESSAGE PROCESSING

(75) Inventors: Gagan Lal Choudhury, Marlboro, NJ (US); Anurag S. Maunder, Fremont, CA (US)

(73) Assignee: AT&T Corp., New York, NY (US)

( * ) Notice: Subject to any disclaimer, the term of this patent is extended or adjusted under 35 U.S.C. 154(b) by 928 days.

(21) Appl. No.: 09/714,621

(22) Filed: Nov. 16, 2000

Related U.S. Application Data

(60) Provisional application No. 60/171,049, filed on Dec. 16, 1999.

(51) Int. Cl.
*H04J 1/16* (2006.01)
*H04L 12/28* (2006.01)

(52) U.S. Cl. ............................ 370/236; 238/412

(58) Field of Classification Search ............ 370/232, 370/235, 238, 412, 395.1, 229, 452, 443, 370/236
See application file for complete search history.

(56) References Cited

U.S. PATENT DOCUMENTS

| | | | |
|---|---|---|---|
| 5,623,668 A * | 4/1997 | Nieuwenhuizen | 718/100 |
| 5,777,987 A * | 7/1998 | Adams et al. | 370/336 |
| 5,881,246 A | 3/1999 | Crawley et al. | |
| 5,917,820 A | 6/1999 | Rekhter | |
| 5,917,823 A | 6/1999 | Benning et al. | |
| 5,995,503 A | 11/1999 | Crawley et al. | |
| 6,018,515 A * | 1/2000 | Sorber | 370/229 |
| 6,049,524 A | 4/2000 | Fukushima et al. | |
| 6,353,616 B1 * | 3/2002 | Elwalid et al. | 370/443 |
| 6,385,174 B1 * | 5/2002 | Li | 370/252 |
| 6,597,663 B1 * | 7/2003 | Rekhter | 370/252 |
| 6,614,757 B1 * | 9/2003 | Rochberger et al. | 370/231 |
| 6,650,626 B1 * | 11/2003 | Cain | 370/256 |
| 6,680,934 B1 * | 1/2004 | Cain | 370/352 |
| 6,683,879 B1 * | 1/2004 | Kado | 370/395.4 |

* cited by examiner

*Primary Examiner*—Andy Lee

(57) ABSTRACT

A node in a network running a link-state routing protocol identifies certain routing control messages and stores the identified messages in separate queues. The queues are weighted such that each message type is allotted a predetermined amount of processing overhead to optimize the message processing by a node. In one embodiment, the node processor processes the queued messages in accordance with the entries in a weighted round robin polling table. An upper limit of processing time can be specified for each visit to a particular message queue.

2 Claims, 4 Drawing Sheets

LINK STATE NETWORK HAVING WEIGHTED CONTROL MESSAGE PROCESSING

CROSS REFERENCE TO RELATED APPLICATIONS

This application claims priority under 35 U.S.C §119(e) from U.S. Provisional Patent Application No. 60/171,049, filed on Dec. 16, 1999, which is incorporated herein by reference.

STATEMENT REGARDING FEDERALLY SPONSORED RESEARCH

Not Applicable.

FIELD OF THE INVENTION

The present invention relates generally to communication networks, and more particularly, to communication networks utilizing link state protocols.

BACKGROUND OF THE INVENTION

Communication networks can include various types of protocols that route data through the network. One such type of protocol is referred to as a link-state protocol. Known link-state protocols include Open Shortest Path First (OSPF), which is used in Internet Protocol (IP) networks, and Private Network-Network Interface (PNNI), which is used in Asynchronous Transfer Mode (ATM) networks.

IP and ATM networks are generally organized into one or more areas each of which includes a link-state database. Link-state routing protocols rely on the exchange of a relatively large number of control messages within each area as the network comes "up," i.e., becomes operational. For example, the network nodes send and receive Link State Advertisement (LSA) messages in the OSPF protocol and PNNI Topology State Update (PTSE) messages in the PNNI protocol for enabling each node to determine the network topology. As the (OSPF) network comes up, OSPF LSA messages are flooded throughout a network area. A given node can receive more than one copy of the same LSA message in which case the first LSA message is regarded as the original and the other LSA messages are regarded as duplicates. An original LSA message is acknowledged over the trunk from which it came and copies of the message are flooded over the other trunks. Duplicate messages are typically discarded after processing.

Another type of OSPF control message is the HELLO message that is periodically exchanged over each trunk connecting neighboring nodes. The HELLO messages are used to determine the status of the trunks, i.e., whether a given trunk is up. There are also some timers which, if expired, result in the generation of control messages. Examples of timers include LSA retransmission timers, HELLO refresh timers and LSA refresh timers.

Generally, link-state routing protocols do not specify the order in which the various control messages are to be serviced when more than one message is outstanding at a network node processor. In accordance with conventional practices, the control messages are serviced in a First-Come-First-Served (FCFS) manner. In some instances, control messages triggered by the expiry of a timer are serviced at a higher priority than other messages without making any further distinctions between the message types.

One disadvantage with such link-state message processing schemes is that certain message types may not be timely processed due to network congestion whenever a relatively large number of LSA messages is generated within a relatively short time interval in the network. Such an event is referred to as an "LSA storm." The network congestion can be the result of nodes/trunks going "down" or coming back up. An LSA storm can be generated due to the failure or recovery of a single trunk, group of trunks, single node, or group of nodes. The failure/recovery can result from a hardware failure or software upgrade, for example. The LSA storm can also be generated due to a near-synchronous refresh of large numbers of LSAs and to sudden bandwidth changes in virtual circuits in the network.

One problem associated with LSA storms is the loss of trunks due to excessively delayed processing of HELLO messages. As long as a trunk between neighboring nodes is considered up, HELLO messages are exchanged between the nodes over the trunk periodically with period T, which is typically between about 5 and 10 seconds. If one of the neighboring nodes does not receive a HELLO message for a predetermined number of consecutive times, e.g., four, the node declares the trunk to be down.

During an LSA storm, HELLO messages can pile up until HELLO messages from neighboring nodes such that they may not processed in a timely manner. For example, HELLO messages are queued behind other control messages arriving at the node before the HELLO messages. Furthermore, if timer-triggered messages are served at a higher priority, then the HELLO messages also have to wait behind control messages triggered by the expiration of a timer. If the total waiting time of a HELLO message is longer than a specified duration nT, which is typically between 15 and 40 seconds, then the trunk will be declared down even though it is up.

For example, a node having 50 trunks and a 1 millisecond processing time for receiving or transmitting a message over a trunk can experience a HELLO message queuing delay of about 15 seconds with an LSA storm of size 150, and a queuing delay of about 40 seconds with an LSA storm of size 400. The LSA storm size corresponds to the number of LSA messages in an LSA storm. If the processing time is doubled, e.g. 2 ms, then the same queuing delays would result from LSA storms half as large.

Declaring a trunk down while it is actually up is disadvantageous for several reasons. Declaring the trunk down triggers the flooding of LSA messages to the entire area (or areas) in which the trunk is located. In addition, all Virtual Circuits (VCs) over the trunk are released and rerouted. Once the waiting time of a HELLO packet is over and the message is processed, the node may declare the trunk up causing possible further VC rerouting. Declaring trunks down while they are up also results in wasted bandwidth and inefficient routing. Furthermore, erroneously declaring trunks down on a relatively large scale can cause the entire network (or area of the network) to enter an oscillatory state that can bring the network down. Thus, LSA storm effects are exacerbated by the very events of trunks going down and up.

A further disadvantage associated with conventional link state message processing is the occurrence of so-called LSA retransmission lockout in which the node processor enters a loop that processes only retransmissions and other timer-triggered messages. Thus, the node processor does not process HELLO, LSA and LSA acknowledgement messages arriving from other nodes while in the loop. LSA retransmission lockout can occur when timer-triggered messages are served at a higher priority than other messages and the timer-triggered messages are generated at a rate equal to or higher than the rate at which they can be processed by the node processor.

LSA retransmission lockout typically results from a combination of events. There are generally three main types of timers: HELLO refresh timers, LSA refresh timers, and LSA retransmission timers. The rates of message generation due to the expiry of the HELLO and the LSA refresh timers are fixed and independent of network conditions (typically one HELLO message per 5 to 10 seconds per trunk and one LSA refresh every 30 minutes per LSA originated by the node). Thus, these messages require only a relatively small fixed fraction of the node processing power.

The rate of message generation due to the expiry of LSA retransmission timers is typically one message every 5 seconds per unacknowledged LSA. This rate depends upon the level of network congestion. Under normal operating conditions the rate of message generation is close to zero since very few LSAs remain unacknowledged for more than 5 seconds. However, under heavy network congestion generated by an LSA storm, it is possible for many LSAs to remain unacknowledged for more than 5 seconds due to congestion either at the transmitting node or at the receiving node, such that LSA retransmission lockout can occur.

Once a node processor enters a retransmission lockout state, it does not process any messages that are not triggered by a timer. This includes acknowledgements to earlier transmissions and retransmissions that would help the node processor to get out of the retransmission lockout state. Eventually the node processor can get out of the retransmission lockout since the LSAs being retransmitted age out. However, this happens after an unacceptably long time, e.g., one hour, before which the node typically goes down.

It would, therefore, be desirable to provide a link-state network protocol that enhances the ability of a network to handle LSA storms.

SUMMARY OF THE INVENTION

The present invention provides a mechanism for link state network protocols to identify certain link state routing control messages, to store the identified messages in respective queues for each message type, and to process the messages in a weighted arrangement, such that each message type is allotted a predetermined amount of node processing power. For each visit to a particular message queue, the processing time can have an upper limit. By distributing node processing power to the various message types, the network reliability and scalability is enhanced as compared with conventional link state networks. Although the invention is primarily shown and described in conjunction with the Open Shortest Path First (OSPF) protocol, it is understood that the invention is equally applicable to other link state protocols, such as the Private Network-Network Interface (PNNI) protocol.

In one aspect of the invention, a communication network includes a plurality of areas in which network nodes are located. The network nodes identify certain link state routing control messages and store them in respective queues. In one embodiment, identified OSPF messages include HELLO messages, Link State Advertisement (LSA) messages, and LSA acknowledgement messages, each of which is sent from other nodes. Certain timer-triggered messages generated by the node itself, such as HELLO refresh timer messages, LSA refresh timer messages, and LSA retransmission timer messages can also be identified. Each message type is stored in a separate queue to which weights are assigned for allotting a predetermined amount of processing power to each of the message types. In one embodiment, the message processing sequence is determined by weighted round robin processing of the message queues.

In a further aspect of the invention, a method for processing control messages in a link state network includes identifying certain control messages and storing the identified messages in respective queues. The method further includes assigning a respective weight to each message type queue and processing the queued control messages in a sequence such that each message type is allotted a predetermined amount of processing time. In one embodiment, incoming OSPF messages identified by a node include HELLO, LSA, and LSA acknowledgement messages and identified self-generated messages include HELLO refresh, LSA refresh, and LSA retransmission messages.

BRIEF DESCRIPTION OF THE DRAWINGS

The invention will be more fully understood from the following detailed description taken in conjunction with the accompanying drawings, in which.

DETAILED DESCRIPTION OF THE INVENTION

The present invention provides a network utilizing a link-state protocol in which network nodes identify certain types of control messages and store the messages in respective weighted queues such that a predetermined amount of processing power is allotted to each message type. During each visit to a message queue, there can be an upper limit on processing time for the message.

Figure 1A:
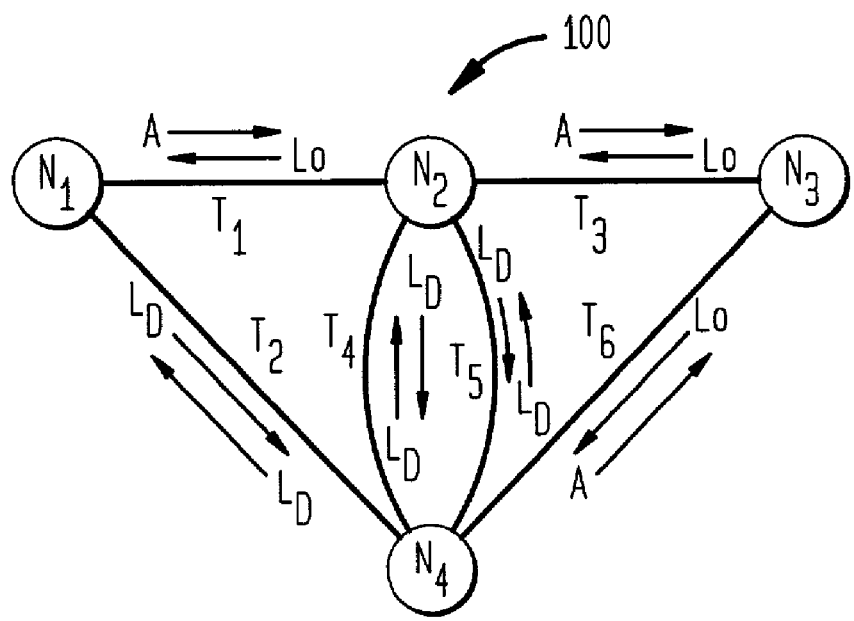
FIG. 1A is a schematic representation of an exemplary network configuration having link-state message processing in accordance with the present invention.
Figure 1B:
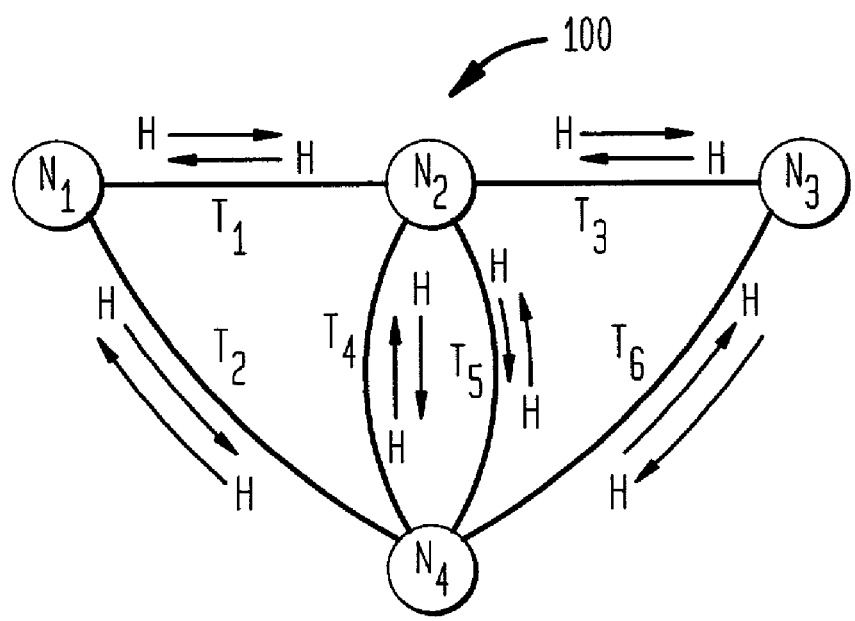
FIG. 1B is a further schematic representation of an exemplary network configuration having link-state message processing in accordance with the present invention.

FIGS. 1A–B show an exemplary communication network 100 that processes certain Open Shortest Path First (OSPF) link-state protocol control messages in accordance with the present invention. FIG. 1A shows link state advertisement (LSA) message flooding and FIG. 1B shows HELLO message generation, in which like reference element indicate like elements.

The network 100 includes four nodes $N_1, N_2, N_3, N_4$ that are interconnected by six trunks $T_1, T_2, T_3, T_4, T_5, T_6$. The first trunk $T_6$, connects the first and second nodes $N_1, N_2$ and the second trunk $T_2$ connects the first and fourth nodes $N_1, N_4$. The second and fourth nodes $N_2, N_4$ are interconnected by the fourth and fifth trunks $T_4, T_5$. The sixth trunk $T_6$ connects the third and fourth nodes $N_3, N_4$. While the trunks T are shown as bi-directional, it is understood that the trunks can be uni-directional as well. It is further understood that the nodes N can be provided from a variety of devices including IP routers and ATM switches (using the PNNI protocol), for example.

As shown most clearly in FIG. 1A, a single LSA message is generated by the third node $N_3$ and is flooded to the rest of the network. LSA messages include original (or first-time) LSA messages $L_O$ and duplicate LSA messages $L_D$. In general, nodes receiving original LSA messages $L_O$ respond with an acknowledgement message A and flood a copy of the original LSA message over other trunks and nodes. Duplicate LSA messages $L_D$ are disregarded.

The third node $N_3$ sends the original LSA message $L_O$ over the trunks $T_3, T_6$, interconnecting the third node with the neighboring second and fourth nodes $N_2$, $N_4$, respectively. The second node $N_2$ then sends an acknowledgement message A back to the third node $N_3$ over the third trunk $T_3$ and floods the LSA messages over interconnecting trunks $T_1$, $T_4, T_5$ to the first and fourth nodes $N_1, N_4$ and $N_4$, respectively. The LSA message $L_O$ to the first node $N_1$, from the second node $N_2$ is a first-time LSA. The LSA messages $L_D$ to the fourth node $N_4$ from the second node $N_2$ over the interconnecting trunks $T_4$, $T_5$ are duplicates since the fourth node $N_4$ previously received a first-time LSA message from the third node $N_3$.

The first node $N_1$, sends an LSA acknowledgement message A to the second node $N_2$ over the connecting trunk $T_1$, and floods an LSA message $L_D$ to the fourth node $N_4$ over a trunk $T_2$. The LSA message is a duplicate since the fourth node $N_4$ previously received a first-time LSA message $L_O$ from the third node $N_3$. The fourth node $N_4$ sends an acknowledgement message back to the third node $N_3$ over the trunk $T_6$ and floods LSA messages $L_D$ over interconnecting trunks $T_2, T_4, T_5$ to the first and second nodes $N_1$, $N_2$ and $N_2$, respectively ($T_4$ and $T_5$ both connect $N_2$ and $N_4$). These LSA messages are all duplicates since the first and second nodes $N_1$, $N_2$ have already received first-time LSA messages $L_O$ from other sources. A duplicate LSA message is an implicit acknowledgement such that no separate acknowledgement is necessary.

FIG. 1B shows the exchange of HELLO messages H among the nodes $N_1-N_4$ in the network 100. Once every TH seconds (where TH is typically 5 or 10), each node $N_1-N_4$ sends a HELLO message over each trunk $T_1-T_6$ to the neighboring node on the other side of the trunk.

In accordance with the present invention, control messages are identified by the node and stored in separate message queues. Self-generated messages, such as timer-triggered messages, can be readily identified by the node. For messages from other nodes in the network, the recipient node can identify message types by examining specified portions of the packet structure.

Figure 2:
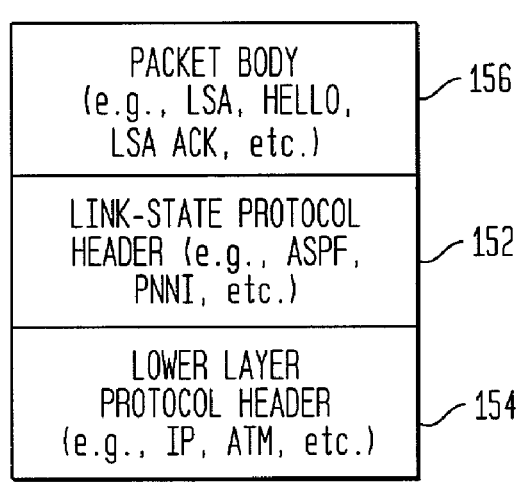
FIG. 2 is a diagram showing an exemplary packet structure for carrying link-state messages in the network of FIGS. 1A–B.

FIG. 2 shows an exemplary packet structure 150 for carrying link-state messages, e.g., LSA, LSA acknowledgement and HELLO messages. In one embodiment, the message type is identified by examining a field in a link-state protocol header 152 that uniquely identifies each message type. For example, the OSPF Packet Type field in the OSPF Protocol can be used for message type identification. For faster identification, the message type can be identified by examining a lower layer protocol header 154. For example, an unused portion of the Type of Service (TOS) field in the IP Packet header or an unused portion of the Virtual Circuit Identifier (VCI) field in the ATM Packet header can be used for this purpose. The packet body 156 contains the message.

Figure 3:
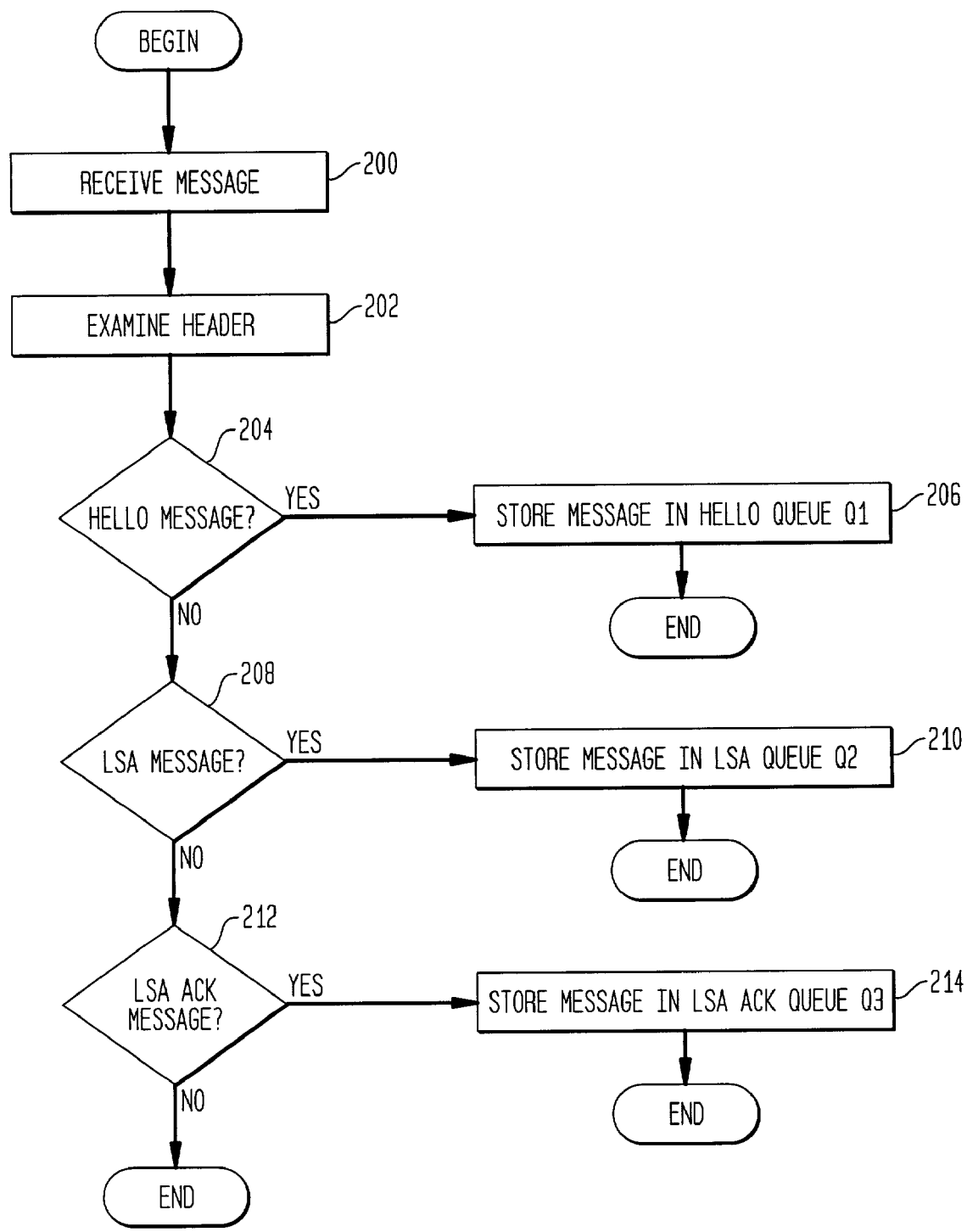
FIG. 3 is a flow diagram showing an exemplary sequence of steps for identifying and storing certain link state control messages in accordance with the present invention.

FIG. 3 shows an exemplary sequence of steps for identifying certain types of incoming OSPF control messages. In one embodiment, the OSPF messages that are identified include HELLO messages, LSA messages (original or duplicate), and LSA acknowledgements. Each of these incoming messages is transmitted by another node via a trunk.

In step 200, a node in the network receives a message from another node and examines the message header in step 202 to determine whether the message is one of the specified routing control messages to be stored in a respective queue. In step 204, the node determines whether the received message is a HELLO message. If the message is a HELLO message from another node, the node stores the message in the HELLO message queue Q1 in step 206.

If the message is not a HELLO message, in step 208 the node determines whether the message is an LSA message. If the message is an LSA message, the node stores the LSA message in the LSA message queue Q2 in step 210. If the message is not an LSA message, in step 212 the node determines whether the received message is an LSA acknowledgement message, and if so, stores the LSA acknowledgement message in the LSA acknowledgement queue Q3 in step 214.

As the node receives further messages from other nodes, the node identifies HELLO, LSA, and LSA acknowledgement messages and stores them in the corresponding message queues Q1, Q2, Q3. It is understood that during an LSA storm, the message queues store the received messages for ultimate processing by the node, as described in detail below.

In addition to routing control messages sent by other nodes, the node identifies certain self-generated messages, such as timer generated messages. Exemplary self-generated control messages for storage and weighted processing include HELLO messages triggered by the HELLO refresh timer, LSA messages triggered by the LSA refresh timer, and LSA messages triggered by the LSA retransmission timer. It is understood that further messages can be identified and stored by the node, such as various control messages triggered by hardware-based timers. Since these messages are generated by the node itself, they are readily identified and stored in respective queues.

In one embodiment, six message queues Q1–6 are formed as shown below in Table 1.

TABLE 1

| HELLO (Q1) | LSA (Q2) | LSA acknowl-edge-ment (Q3) | HELLO refresh timer (Q4) | LSA refresh timer (Q5) | LSA retrans-mission timer (Q6) |
|---|---|---|---|---|---|
| msg1 | msg1 | msg1 | msg1 | msg1 | msg1 |
| msg2 | msg2 | msg2 | msg2 | msg2 | msg2 |
| ... | ... | ... | ... | ... | ... |
| msgM$_{HEL}$ | msgM$_{LSA}$ | msgM$_{ACK}$ | msgM$_{HR}$ | msgM$_{LR}$ | msgM$_{RET}$ |

The HELLO, LSA, and LSA acknowledgement messages are received from other nodes and can be identified by examining a field in the packet header, as described above. The remaining messages, i.e., the timer based messages, are generated by the node such that they are readily identified by the node.

In general, the message queues Q1–6 are assigned a weight so as to apportion a predetermined amount of processing power, which can be based upon CPU cycles, to each of the queues. The queues are weighted to optimize message processing during LSA storms for minimizing the likelihood that the network goes down due to a software upgrade or hardware failure, for example.

It is understood that a variety of weighting schemes can be used to vary the processing time allotted to each of the queues. Exemplary schemes include weighted round robin and weighted fair queuing.

Figure 4:
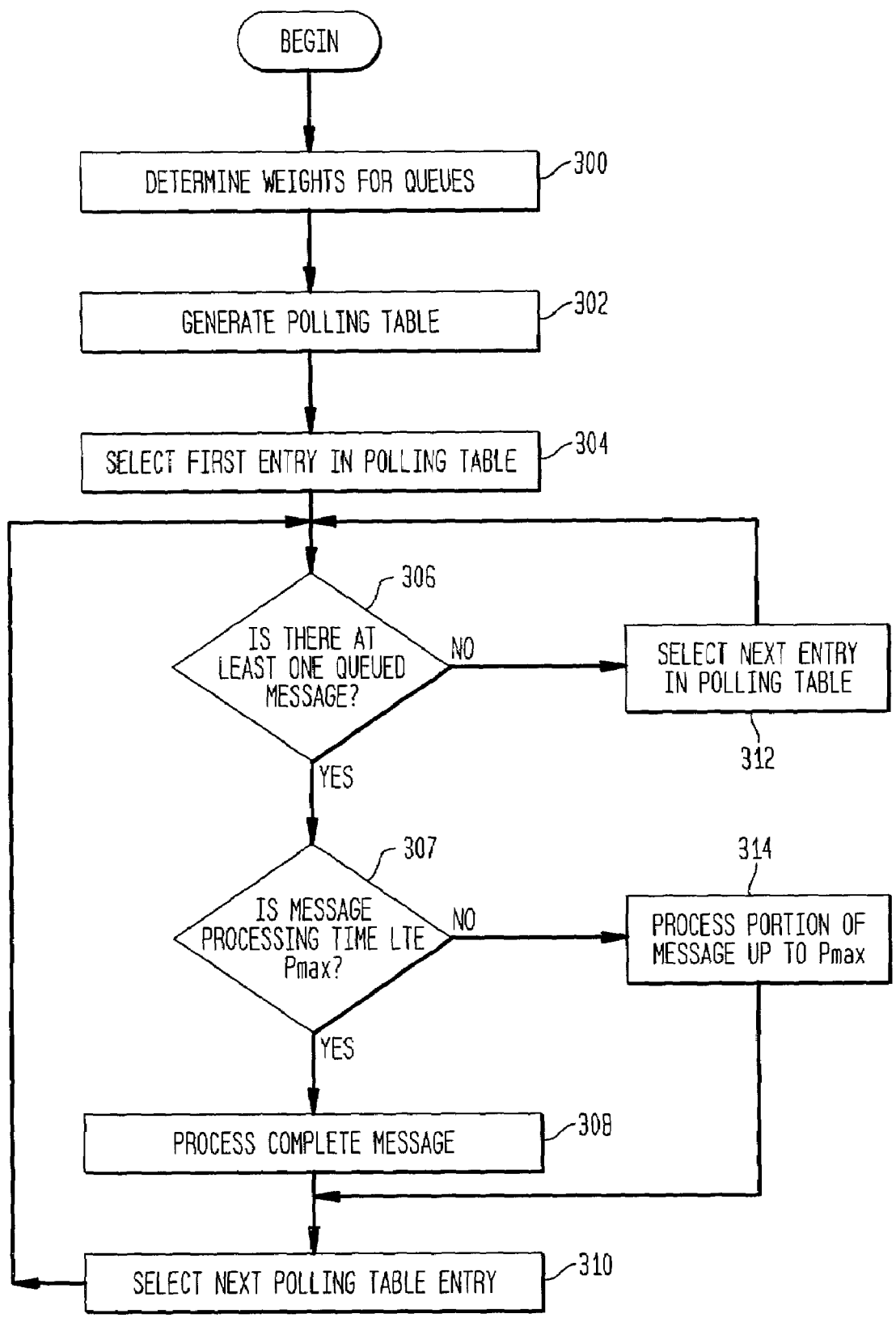
FIG. 4 is a flow diagram showing an exemplary sequence of steps for processing stored control messages in accordance with the present invention.

FIG. 4 shows an exemplary sequence of steps for processing the queued control messages in a weighted round robin manner. In step 300, the relative weight desired for each message queue is determined. The relative weights are selected such that each message type receives a selected processing rate even when one or more message queues are overloaded. It is understood that the weights can be multiplied by a constant such that each weight in an integer. In step 302, a round robin polling table is generated such that the number of entries corresponds to the sum of the weights, i.e., $$W_{SUM} = \sum_{i=1}^{6} W_i.$$

Each entry corresponds to one of the message queues, which has an associated weight. Unless, each queue is given a weigh of one, at least one message queue has multiple entries in the polling table as demonstrated in the exemplary polling table of FIG. 5.

Figure 5:
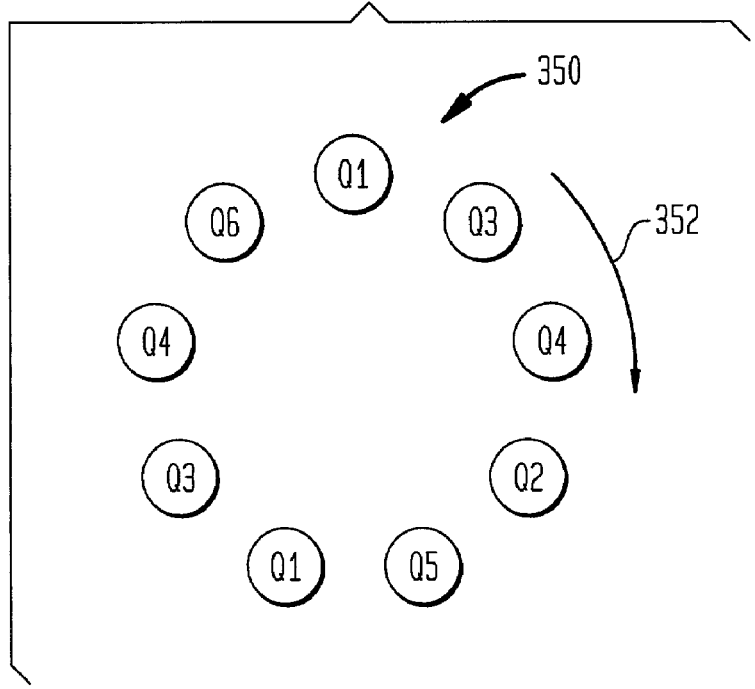
FIG. 5 is a pictorial representation of an exemplary sequence for processing messages stored in weighted queues in accordance with the present invention.

FIG. 5 shows an exemplary weighted round robin polling table 350, in which the sum of the queue weights corresponds to the number of entries in the polling table, e.g., $W_1=W_3=W_4=2$, $W_2=W_5=W_6=1$, and $W_{SUM}=9$. That is, the weight assigned to Q1 (HELLO), Q3 (LSA acknowledgement), and Q4 (HELLO refresh) is two and the weight assigned to Q2 (LSA), Q5 (LSA refresh), and Q6 (LSA retransmission refresh) is one. The sum of the weights assigned to the queues Q1–6 is nine, which corresponds to the number of entries in the round robin polling table 350. The entries in the polling table are then positioned to minimize the distance between visits to a particular queue. More particularly, the entries corresponding to the same queue should generally be spread evenly throughout the polling table. It is understood that the position of the table entry determines the sequence in which the queues are served by the node processor.

For example, the polling table 350 has two entries for Q1 (HELLO messages) that should be spaced apart rather than placed together. More particularly, the maximum distance between successive visits to the polling table entries is $$\left\lceil \frac{W_{SUM}}{W_i} \right\rceil.$$

As known to one of ordinary skill in the art, the ⌈ ⌉ operator returns the smallest integer greater than or equal to the argument. Thus, the distance is five for queues Q1, Q3, Q4 having two entries and the distance is nine for queues Q2, Q5, Q6 having a single entry. The node can process the messages in the queues Q1–6 in a predetermined direction, such as the clockwise direction indicated by arrow 352.

Referring again to FIG. 4 in conjunction with FIG. 5, in step 304, the node processor selects the first entry Q1 in the round robin polling table 350. In step 306, the node processor determines whether there is a HELLO message in the HELLO queue Q1 to be processed. If there is not a HELLO message in the HELLO queue Q1 the next entry, i.e., Q3, in the polling table 350 is selected in step 312. If there is a message in the HELLO queue Q1, the node processor determines whether the processing time for the message is less than or equal to a maximum processing time $P_{MAX}$ in step 307. If so, the complete message is processed in step 308 and the next polling table entry is selected in step 310.

If the message processing time is greater then $P_{MAX}$ as determined in step 307, a portion of the message up to $P_{MAX}$ is processed by the node processor in step 314. The next polling table entry is then selected in step 310.

In this manner, each of the message queues in the polling table 350 is serviced in a predetermined order, i.e., Q1-Q3-Q4-Q2-Q5-Q1-Q3-Q4-Q6 and back to Q1. It is understood that the arrangement of the message queues that defines the processing sequence can be readily modified by one of ordinary skill in the art.

This arrangement dedicates a predetermined portion of the node processing power to each message queue Q1–6. The portion assigned to message type i can be computed as:

$$\frac{W_i P_i}{\sum_{j=1}^{6} W_j P_j},$$

where $P_j$ is the processing time for processing a message of type j assuming that $P_j$ does not exceed an upper limit $P_{max}$, $W_j$ is the weight assigned to message type j, and $W_i$ is the weight assigned to message type i.

In addition, valuable processing power is not wasted when there are no messages in a given queue since the total routing processor power is distributed among the other message types in proportion to their relative weights.

The weighted round robin processing of link-state control messages described above reduces or eliminates network failures due to excessively delayed HELLO messages and LSA retransmission lockout. By sufficiently weighting the HELLO and HELLO refresh messages queues Q1, Q4, the node processor can process these messages at a predetermined rate independent of the network congestion level so that a trunk is not declared down when it is actually up.

In addition, retransmission lockout should not occur since even in the case where there is a relatively high number of messages to be retransmitted a fraction of the node processing power is allotted to messages that are not triggered by the expiry of timers, i.e., HELLO (Q1), LSA (Q2), and LSA acknowledgement (Q3) messages. Furthermore, even if a relatively large number of unacknowledged messages accumulate following a severe LSA storm, these messages dissipate relatively quickly since acknowledgments are processed at a predetermined rate regardless of the level of network congestion.

It is understood that in addition to the processing of routing control messages as described above, the node processor provides other functionality as well, such as processing signaling messages, network control messages, and the like. In general, a fraction F of the total node processing power is dedicated for the processing of routing control messages. In one embodiment, a polling table for the node includes $W_{RC}+W_p$ entries of which $W_{RC}$ entries are dedicated to processing routing control messages and $W_p$ entries are dedicated to other tasks. Thus, $F=W_{RC}P/(W_{RC}P+W_pP')$, where P is the mean processing time of a single routing control message and P' is the mean processing time of a single message of the other tasks.

While the invention is primarily described in conjunction with OSPF, it is understood that the invention is equally applicable to PNNI in ATM and other link-state protocols.

The below examples of conventional link state message processing and link state message processing in accordance with the present invention demonstrate how the invention overcomes some of the disadvantages of conventional message processing declaring trunks down even though they are actually up.

EXAMPLE 1

Conventional HELLO Message Processing

An LSA storm of size S is generated within an area of the network as a result of the failure or recovery of a single trunk, a group of trunks, a single node or a group of nodes. Focusing on a node N within the area, let L be the number of trunks attached to node N, and P be the average processing time needed either to receive a message or to transmit it over a single trunk. HELLO messages are exchanged every T seconds over every trunk. If no HELLO message is received for n Hello intervals (i.e., a period of time nT) then the trunk is declared down. R is the LSA retransmission timer value, i.e., if no acknowledgment is received for an LSA transmitted to a neighboring node within a time-period R, then it is retransmitted.

In a conventional link state network, for each LSA message in the LSA storm, node N will get one original message over one of the L trunks, acknowledge it, and flood duplicate LSA messages over all trunks except the one over which the LSA arrived. The total processing time needed for this work can be computed as the product of the number of trunks L multiplied by the processing time P, i.e., LP. In the worst case, the node will also receive duplicate messages from all other trunks as well and the total processing time for that work is also about LP. So the total processing time at node N to process all messages resulting from the storm can be expressed as 2SLP. Since the inter-arrival time between HELLO messages is relatively long (typically 5 to 10 seconds), it is possible for all the work (about 2SLP) at node N to arrive between successive arrivals of HELLO messages over a certain trunk. In that case, assuming conventional first-come-first-served processing, the waiting time for the second HELLO message would be about 2SLP. Therefore, the condition under which a link will be declared down (even when it is actually up) due to not processing HELLO messages is given by $$2SLP > nT \text{ or,} \quad (1)$$

$$S > \frac{nT}{2LP} \quad (2)$$

Assuming L=50, P=1 ms, n=3 (n is the number of HELLO intervals) and T=5 seconds, the above condition is satisfied for any LSA storm of size S>150. In addition, assuming L=50, P=1 ms, n=4 and T=10 seconds, the above condition is satisfied for any LSA storm of size S>400. Also, from Equation (2) we see that if P is 2 ms instead of 1 ms then the values of S stated above would be 75 and 200 respectively.

In the relatively simple analysis above, it should be noted that certain effects were not taken into account. For example, a portion of the total work of LSA processing would be done before the arrival of the second HELLO message. In addition, there would be other work resulting from other control messages that are not part of the LSA storm, either coming from a different node or triggered by the expiry of a timer. The above effects are opposing in nature and would partially cancel each other.

EXAMPLE 2

HELLO Message Processing in Accordance with the Present Invention for Reducing or Eliminating the Chance of Declaring Trunks Down Even when they are Actually Up As described above, the fraction of the node processor dedicated to processing Type i messages is $$FW_i P_i \bigg/ \left( \sum_{j=1}^{6} W_j P_j \right)$$

where F is the fraction of node processor dedicated to routing control work, and $W_i$, $P_j$ are the relative weight and processing time, respectively, for type i message. The rate at which type i messages may be processed is therefore $$FW_i \bigg/ \left( \sum_{j=1}^{6} W_j P_j \right).$$

Consider the guaranteed minimum rate at which HELLO messages can be processed. Note that the type 1 (Q1) message represents HELLO messages received from another node and the type 4 (Q4) message represents HELLO messages generated by node N, i.e., HELLO refresh messages. The minimum processing rate occurs when the message processing times $P_j$s get their maximum possible values. Among the 6 message types, the processing times for types 1, 4 and 3 (HELLOs and acknowledgments to LSAs) should be relatively small and unaffected by network congestion. Let their maximum value be $\hat{P}$. The other three message types are LSAs and may be large under network congestion and so we assume them to achieve the value $P_{max}$, the maximum allowed for any message type. Therefore, the guaranteed minimum rate for type i messages is $FW_i/((W_1+W_3+W_4)\hat{P}+(W_2+W_5+W_6)P_{max})$. Since node N has L trunks, the rate at which HELLO messages (either type 1 message or type 4 message) need to be processed at node N is (L/T). Therefore, HELLO messages are processed at or above the desired minimum rate if the following relation holds:

For $i=1$ and 4, $FW_i/((W_1+W_3+W_4)$
$\hat{P}+(W_2+W_5+W_6)P_{max})>L/T$ (3)

It should be noted that the above relationship is independent of the network congestion, i.e., the size of the "LSA storm." Let F=0.5, $W_1=W_3=W_4=2$, $W_2=W_5=W_6=1$ and $W_{SUM}=9$, as described above in the polling table of FIG. 5, $\hat{P}=1$ ms=0.001 sec, $P_{max}=10$ ms=0.01 sec, T=5 sec, and L=50, the same values as used in conventional Example 1, above.

For the above parameter values, Equation (3) is satisfied so that HELLO messages are processed at the required rate regardless of the network congestion level. In fact, the condition continues to be satisfied for even a larger node connectivity, L, as long as the node connectivity does not exceed 138. By using larger values of $W_1$ and $W_4$, Equation 3 can be satisfied for even larger node connectivity, unless the node connectivity gets so large that the node processor cannot keep up processing just the HELLO messages.

EXAMPLE 3

Conventional OSPF Leading to LSA Retransmission Lockout

Consider the same LSA storm example as in Example 1. The LSAs in the storm originated by node N are transmitted over all L trunks and other LSAs are transmitted over all trunks except the one on which the message came. So, the total number of LSAs transmitted by node N is about SL. The maximum rate of LSA generation at node N due to retransmission timer expiry is about SL/R. The maximum rate at which node N can process the retransmitted LSAs is (1/P). So, the condition for LSA retransmission lockout (i.e., the condition under which the node processor enters an infinite loop processing only retransmissions and nothing else) is given by $$\frac{SL}{R} > \frac{1}{P} \text{ or,} \quad (4)$$

$$S > \frac{R}{LP} \quad (5)$$

Assuming L=50, R=5 seconds and P=1 milliseconds, LSA retransmission lockout can occur for any storm of size S>100.

It should be noted that there are two opposing effects that have not been taken into account in the simple model above. The first effect is that, some of the LSAs are likely to be acknowledged before the onset of the first retransmission. The second effect is that besides the retransmitted LSAs considered above there are other control messages triggered by Hello refresh timers and LSA refresh timers. The first effect implies that the LSA storm size has to be bigger than what is shown in Equation (5) for the retransmission lockout to happen. The second effect implies that even an LSA storm of size smaller than what is shown in Equation (5) would cause retransmission lockout, or more generally, timer-triggered lockout. So the two effects are opposite in nature and tend to cancel each other.

EXAMPLE 4

OSPF in Accordance with the Present Invention Reducing or Eliminating Retransmission Lockout As described above, the fraction of the node processor dedicated to processing type i messages is $$FW_i P_i \bigg/ \left( \sum_{j=1}^{6} W_j P_j \right)$$

and the guaranteed minimum rate at which messages of type i are served is $FW_i/((W_1+W_3+W_4)\hat{P}+(W_2+W_5+W_6)P_{max})$.

There will not be a retransmission lockout since even if there are many messages to be retransmitted, a fraction of the node processing power is reserved for messages that are not triggered by the expiry of a timer, i.e., type 1, 2 and 3 messages. For acknowledgments to LSAs, i.e., i=3, using the same parameter values as Example 2, the minimum guaranteed rate at which acknowledgments are processed is about 27.8 per second. So, even if a relatively large number of unacknowledged messages accumulate following a severe LSA storm, the unacknowledged messages are dissipated relatively quickly. Furthermore, the rate of dissipation can be increased further by increasing $W_3$, the relative weight for the acknowledgment message queue Q3.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method for processing link state routing control messages by a network node, comprising;
identifying control messages that need to by processed by said node type, from a set of predetermined types;
storing each of the type-identified control messages, by type, in a respective one of a plurality of message queues;
assigning a weight to each of the respective message queues based on urgency considerations for processing said control message;
developing a sequence of said queues based on said weights, by use of a round robin table with number of appearances of said queues in said table being a function of the weights assigned to said queues, and a number of entries in the round robin table corresponding to a sum of the weights assigned to the message queues;
accessing said queues in accord with said sequence, and processing the control messages queued in the accessed queue for at most a processing time of T seconds, where T is preselected; and
positioning the entries in the round robin table so as to minimize a distance between multiple entries corresponding to the same message type queue.

2. A method for processing link state routing control messages by a node in a network, comprising;
identifying predetermined routing control message types based upon a value in a header of routing control messages received by the node;
identifying predetermined routing control messages generated by the node;
storing each type of identified routing control message in a corresponding one of a plurality of message queues;
assigning a weight to each of the message queues;
generating a round robin polling table having a number of entries corresponding to the sum of the weights assigned to the message type queues;
processing the entries in the round robin polling table such that a predetermined amount of processing power is allotted to each of the message queues; and
minimizing a distance between entries in the polling table that correspond to the same message queue.

* * * * *